US012681307B2

(12) United States Patent
Peng et al.

(10) Patent No.: US 12,681,307 B2
(45) Date of Patent: Jul. 14, 2026

(54) NEAR-EYE DISPLAY DEVICE AND CONSTRUCTION METHOD FOR METASURFACE LENS

(71) Applicant: BOE Technology Group Co., Ltd., Beijing (CN)

(72) Inventors: Weiting Peng, Beijing (CN); Qiuyu Ling, Beijing (CN); Wei Wang, Beijing (CN); Xianqin Meng, Beijing (CN); Pengxia Liang, Beijing (CN); Qian Wu, Beijing (CN)

(73) Assignee: BOE Technology Group Co Ltd, Beijing (CN)

( * ) Notice: Subject to any disclaimer, the term of this patent is extended or adjusted under 35 U.S.C. 154(b) by 327 days.

(21) Appl. No.: 18/274,473

(22) PCT Filed: Dec. 27, 2021

(86) PCT No.: PCT/CN2021/141731
§ 371 (c)(1),
(2) Date: Jul. 27, 2023

(87) PCT Pub. No.: WO2023/122897
PCT Pub. Date: Jul. 6, 2023

(65) Prior Publication Data
US 2024/0094538 A1 Mar. 21, 2024

(51) Int. Cl.
*G02B 27/01* (2006.01)
*G02B 1/00* (2006.01)
(52) U.S. Cl.
CPC ......... *G02B 27/0172* (2013.01); *G02B 1/002* (2013.01)

(58) Field of Classification Search
CPC ..... G02B 27/0172; G02B 1/002; G02B 27/01
See application file for complete search history.

(56) References Cited

U.S. PATENT DOCUMENTS

| | | |
|---|---|---|
| 2019/0079321 A1 | 3/2019 | Wu et al. |
| 2021/0231845 A1 | 7/2021 | Wang et al. |

(Continued)

FOREIGN PATENT DOCUMENTS

| | | |
|---|---|---|
| CN | 109709675 A | 5/2019 |
| CN | 112119342 A | 12/2020 |

(Continued)

OTHER PUBLICATIONS

International Search Report for PCT/CN2021/141731 Mailed Sep. 15, 2022.

(Continued)

*Primary Examiner* — James C. Jones

(57) ABSTRACT

The present disclosure provides a near-eye display device and a construction method for a meta lens. The near-eye display device includes a substrate (10), a meta lens array (40) provided on the side of the substrate (10) close to an eye (100), and a pixel island array (30) located on the side of the substrate (10) away from the eye (100). The pixel island array (30) includes a plurality of pixel islands. The meta lens array (40) includes a plurality of meta lenses. The orthographic projection of the lens center of the meta lens on the substrate (10) overlaps the orthographic projection of the pixel center of the pixel island on the substrate. The lens center is the geometric center of the meta lens, and the pixel center is the geometric center of the pixel island.

14 Claims, 12 Drawing Sheets

(56)    References Cited

U.S. PATENT DOCUMENTS

2021/0364799 A1 * 11/2021 Guo ................... G02B 27/1013
2022/0052297 A1  2/2022 Wang et al.

FOREIGN PATENT DOCUMENTS

| CN | 112987295 A | 6/2021 |
| CN | 113471390 A | 10/2021 |
| CN | 113655547 A | 11/2021 |
| CN | 113655548 A | 11/2021 |
| WO | 2020223399 A1 | 11/2020 |
| WO | 2021184324 A1 | 9/2021 |

OTHER PUBLICATIONS

Office Action dated Jul. 9, 2025 for CN202180004223.3 and English Translation.

* cited by examiner

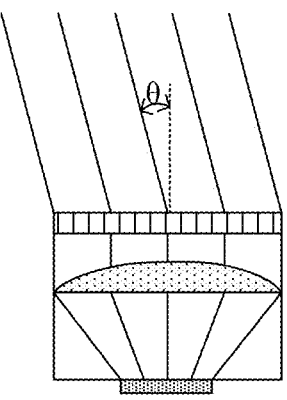
FIG. 4c
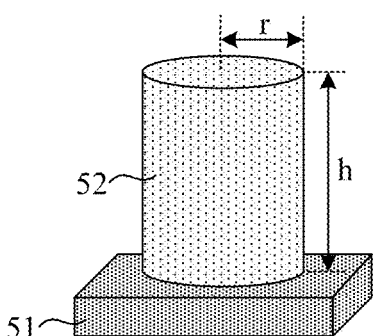
FIG. 5
| Metasurface structure unit | Radius (nm) | Phase (°) | Metasurface structure unit | Radius (nm) | Phase (°) |
|---|---|---|---|---|---|
| | 105 | 0 | | 75 | 178 |
| | 110 | 32 | | 85 | 235 |
| | 55 | 90 | | 90 | 266 |
| | 125 | 316 | | 100 | 329 |
FIG. 6

NEAR-EYE DISPLAY DEVICE AND CONSTRUCTION METHOD FOR METASURFACE LENS

CROSS-REFERENCE TO RELATED APPLICATION

The present application is a U.S. National Phase Entry of International Application PCT/CN2021/141731 having an international filing date of Dec. 27, 2021, and entitled "Near-eye Display Device and Construction Method of Metalens", the contents of the above-identified application are incorporated herein by reference.

TECHNICAL FIELD

The present disclosure relates to, but is not limited to, the technical field of display, in particular to a near-eye display device and a construction method of a metalens (or metasurface lens).

BACKGROUND

Virtual Reality (VR) and Augmented Reality (AR) devices have been gradually applied to display, games, medical and other fields, and use of near-eye display technology for realizing VR/AR has attracted more and more attention and researches. The near-eye display enables a viewer to see contents very close to his/her eyes by using an optical system to image display content in a focus range of the eyes, so that the eyes can see the display content clearly.

SUMMARY

The following is a summary of subject matter described herein in detail. The summary is not intended to limit the protection scope of claims.

In one aspect, an exemplary implementation of the present disclosure provides a near-eye display device including a substrate, a metalens array disposed on a side of the substrate close to an eye, and a pixel island array located on a side of the substrate away from the eye, wherein the pixel island array includes a plurality of pixel islands, the metalens array includes a plurality of metalenses which are in one-to-one correspondence with the plurality of pixel islands, an orthographic projection of a lens center of a metalens on the substrate is overlapped with an orthographic projection of a pixel center of a pixel island on the substrate, the lens center is a geometric center of the metalens, and the pixel center is a geometric center of the pixel island.

In an exemplary implementation, at least one of the metalenses has an imaging function and a light deflection function, and the metalens satisfies a following lens phase formula:

$$\varphi(x,y)=-2\pi(\sqrt{(x^2+y^2)+f^2}-f)/\lambda+2\pi(x\cos\varphi+y\sin\varphi)\sin\theta/\lambda$$

where (x, y) is coordinates of different position points on the metalens, a geometric center of the metalens is a coordinate origin, $\varphi$ (x, y) is a phase at a position point (x, y) on the metalens, $\lambda$ is a wavelength of incident light, f is a focal length of the metalens, $\Phi$ is a coordinate azimuth angle of a pixel island corresponding to the metalens, and $\theta$ is a light deflection angle required by the pixel island corresponding to the metalens.

In an exemplary implementation, the plurality of pixel islands are configured to respectively display a part of images in a complete picture, and the plurality of metalenses are configured to modulate an optical path so that images of all of the pixel islands are spliced into the complete picture.

In an exemplary implementation, the plurality of metalenses have a same lens aperture and a same focal length.

In an exemplary implementation, the metalens includes a plurality of metasurface units regularly arranged by a unit period, at least one of the metasurface units includes a base substrate and a column disposed on the base substrate, and a refractive index of the base substrate is different from a refractive index of the column.

In an exemplary implementation, a difference between the refractive index of the base substrate and the refractive index of the column is greater than or equal to 0.5.

In an exemplary implementation, a material of the base substrate includes a silicon oxide, and a material of the column includes a silicon nitride.

In an exemplary implementation, a height of the column is 500 nm to 800 nm.

In an exemplary implementation, the column is a cylinder having a radius of 55 nm to 125 nm.

In an exemplary implementation, the unit period is 200 nm to 300 nm.

In another aspect, an exemplary implementation of the present disclosure further provides a construction method of a metalens, including following steps:

constructing a lens structure database, wherein the lens structure database includes a plurality of basic phases and a plurality of metasurface units corresponding to the plurality of basic phases;

acquiring phases at different positions on a metalens which is configured to have both an imaging function and a light deflection function;

determining metasurface units at different regional positions on the metalens according to the phases at different positions on the metalens and the lens structure database; and constructing the metalens by using the metasurface units at different regional positions on the metalens.

In an exemplary implementation, the constructing the lens structure database includes:

constructing a basic structure database including a plurality of metasurface units whose phase information covers a range of 0 to $2\pi$;

obtaining a plurality of basic phases according to a preset phase selection strategy; and selecting a plurality of metasurface units corresponding to the plurality of basic phases from the basic structure database to form the lens structure database.

In an exemplary implementation, the acquiring the phases at different positions on the metalens includes:

obtaining the phases at different positions on the metalens according to a lens phase formula, wherein the lens phase formula is:

$$\varphi(x,y)=-2\pi(\sqrt{(x^2+y^2)+f^2}-f)/\lambda+2\pi(x\cos\varphi+y\sin\varphi)\sin\theta/\lambda$$

where (x, y) is coordinates of different position points on the metalens, a geometric center of the metalens is a coordinate origin, $\varphi$ (x, y) is a phase at a position point (x, y) on the metalens, $\lambda$ is a wavelength of incident light, f is a focal length of the metalens, $\Phi$ is a coordinate azimuth angle of a pixel island corresponding to the metalens, and $\theta$ is a light deflection angle required by the pixel island corresponding to the metalens.

3

In an exemplary implementation, the obtaining the plurality of basic phases according to the preset phase selection strategy includes:

discretizing the phases at different positions on the metalens, and acquiring phases of different regions on the metalens; and determining the metasurface units at different regional positions on the metalens according to the phases of different regions on the metalens and the lens structure database.

In an exemplary implementation, the constructing the metalens by using the metasurface units at different regional positions on the metalens includes: performing structural filling at different regional positions on the metalens by using the acquired metasurface units at different regional positions, so as to construct the metalens.

Other aspects may be understood upon reading and understanding the drawings and detailed description.

BRIEF DESCRIPTION OF DRAWINGS

Accompanying drawings are intended to provide a further understanding of technical solutions of the present disclosure and form a part of the specification, and are used to explain the technical solutions of the present disclosure together with embodiments of the present disclosure, and do not form limitations on the technical solutions of the present disclosure.

Shapes and sizes of various components in the drawings do not reflect actual scales, but are only intended to schematically illustrate contents of the present disclosure.

FIG. 4c is a schematic diagram of modulation effect of a metalens when expressing lens phases and deflected grating phases.

FIG. 5 is a schematic diagram of a structure of a metasurface unit according to an exemplary implementation of the present disclosure.

FIG. 6 is a schematic diagram of a lens structure database according to an exemplary implementation of the present disclosure.

4

Figure 14A:
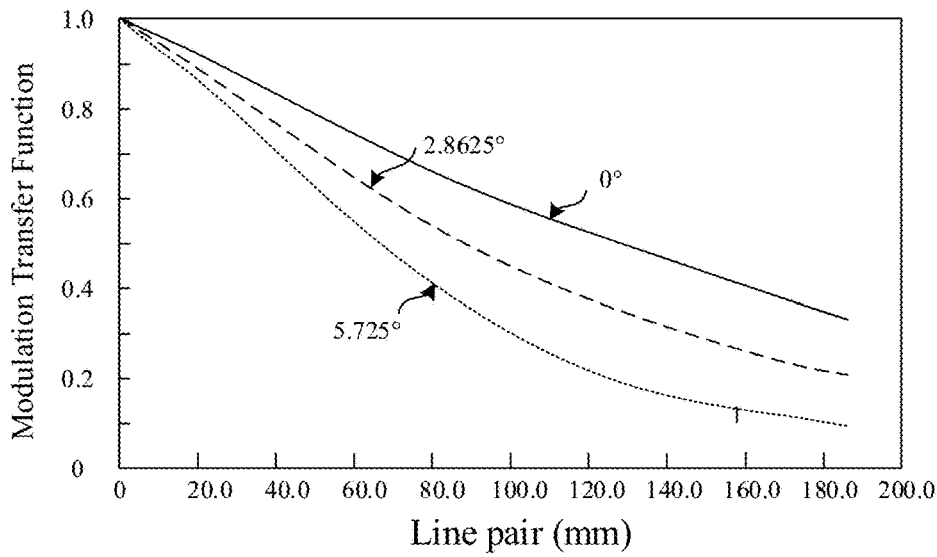

FIG. 14a is an MTF curve of a geometric lens imaging at 5.725°+5.725° field of view.

Figure 14B:
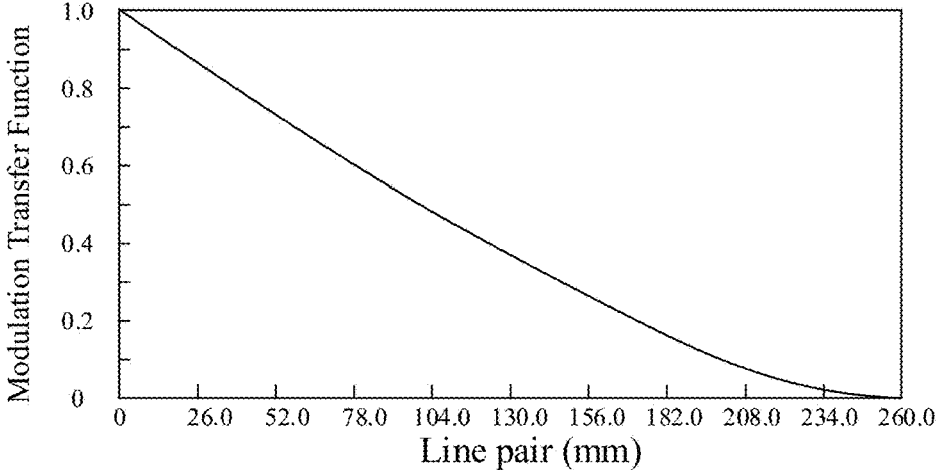

FIG. 14b is an MTF curve of a metalens imaging at 5.725°+5.725° field of view.

Figure 10:
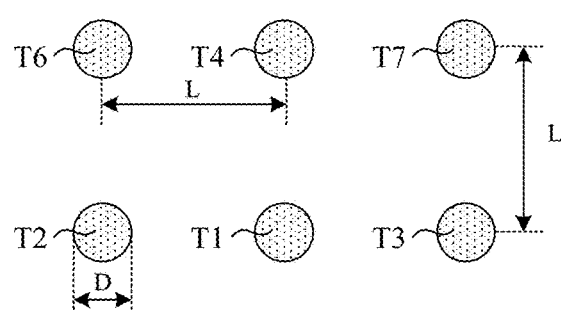
FIG. 10 is a schematic diagram of a metalens array according to an exemplary implementation of the present disclosure.
Figure 10:
Figure 15A:
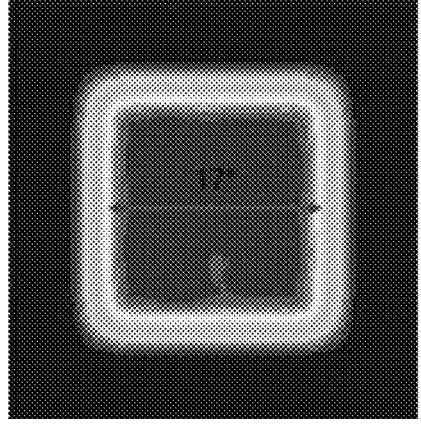

FIG. 15a is a schematic diagram of splicing display effect of the metalens array shown in FIG. 10.

Figure 15B:
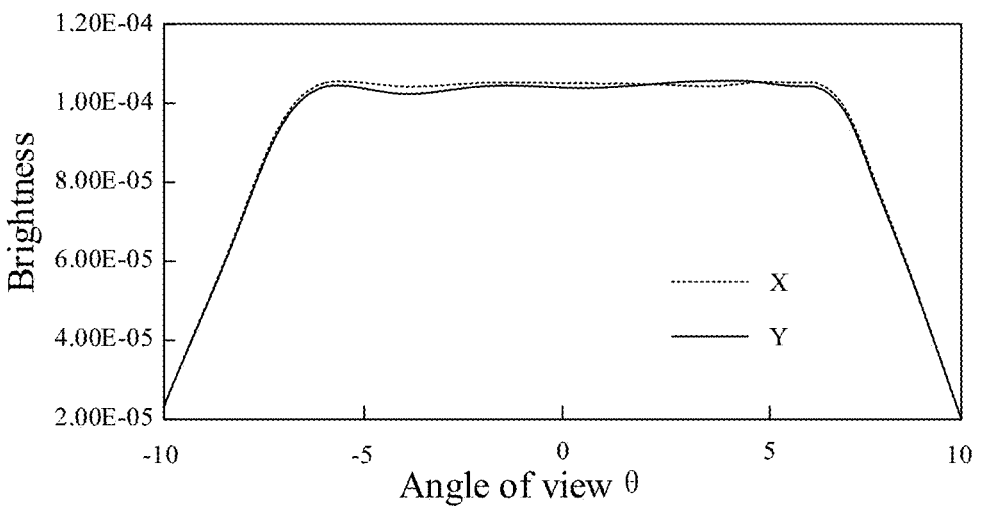

FIG. 15b is curve graph of display brightness distribution of the metalens array shown in FIG. 10.

Figure 16:
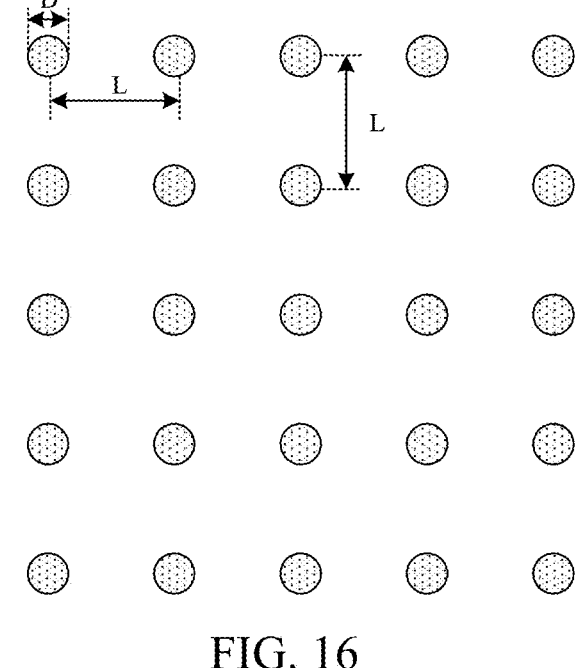

FIG. 16 is a schematic diagram of another metalens array according to an exemplary implementation of the present disclosure.

Figure 17A:
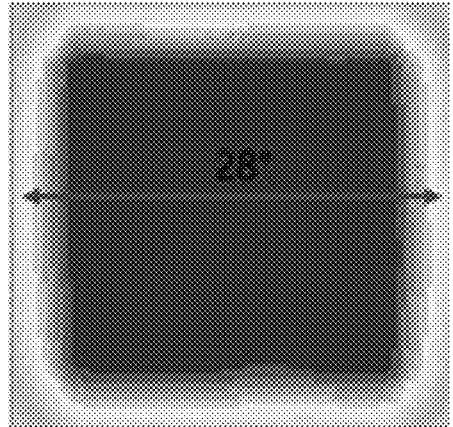

FIG. 17a is a schematic diagram of splicing display effect of the metalens array shown in FIG. 16.

Figure 17B:
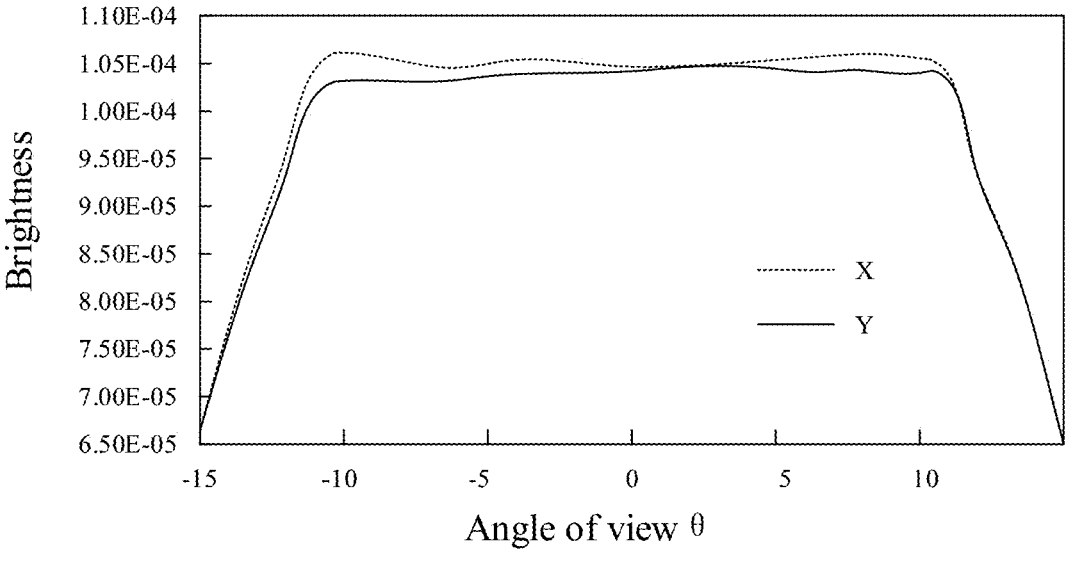

FIG. 17b is a curve graph of display brightness distribution of the metalens array shown in FIG. 16.

Figure 18:
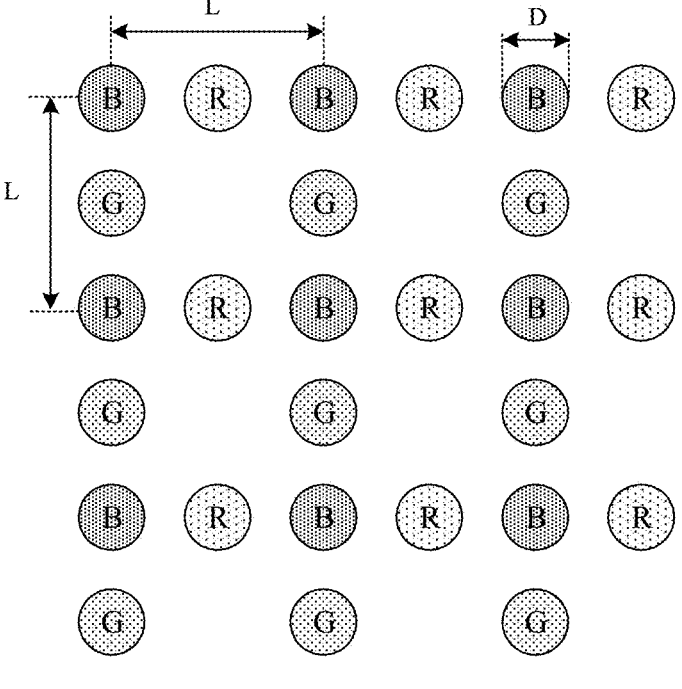

FIG. 18 is a schematic diagram of another metalens array according to an exemplary implementation of the present disclosure.

| Description of reference signs: | | |
| --- | --- | --- |
| 10-substrate; | 20-microlens array; | 30-pixel island array; |
| 40-metalens array; | 51-base substrate; | 52-column; |
| 100-eye; | 200-virtual image. | |

DETAILED DESCRIPTION

To make objectives, technical solutions, and advantages of the present disclosure clearer, the embodiments of the present disclosure will be described in detail with reference to the accompanying drawings. It is to be noted that implementations may be practiced in a plurality of different forms. Those of ordinary skills in the art may easily understand such a fact that implementations and contents may be transformed into various forms without departing from the purpose and scope of the present disclosure. Therefore, the present disclosure should not be explained as being limited to contents described in following implementations only. The embodiments in the present disclosure and features in the embodiments may be combined randomly with each other if there is no conflict. In order to keep the following description of the examples of the present disclosure clear and concise, detailed descriptions of part of known functions and known components are omitted in the present disclosure. The drawings in the embodiments of the present disclosure relate only to the structures involved in the embodiments of the present disclosure, and other structures may be described with reference to conventional designs.

Scales of the drawings in the present disclosure may be used as a reference in actual processes, but are not limited thereto. For example, a width-length ratio of a channel, a thickness and spacing of each film layer, and a width and spacing of each signal line may be adjusted according to actual needs. The number of pixels in the display substrate and the number of sub-pixels in each pixel are not limited to the numbers shown in the drawings. The drawings described in the present disclosure are schematic structural diagrams only, and one implementation of the present disclosure is not limited to the shapes, numerical values or the like shown in the drawings.

Ordinal numerals such as "first", "second", and "third" in the specification are set to avoid confusion between constituent elements, but not to set a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred device or element must have a particular orientation and be constructed and operated in the particular orientation. Therefore, they cannot be understood as limitations on the present disclosure. The positional relationships between the constituent elements may be changed as appropriate according to directions for describing the various constituent elements. Therefore, appropriate replacements may be made according to situations without being limited to the wordings described in the specification.

In the specification, unless otherwise specified and defined explicitly, terms "mount", "mutually connect", and "connect" should be understood in a broad sense. For example, a connection may be a fixed connection, or a detachable connection, or an integrated connection. It may be a mechanical connection or an electrical connection. It may be a direct mutual connection, or an indirect connection through middleware, or an internal communication between two elements. Those of ordinary skills in the art may understand specific meanings of these terms in the present disclosure according to specific situations.

In the specification, a transistor refers to an element which at least includes three terminals, i.e., a gate electrode, a drain electrode and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, the first electrode may be a source electrode, and the second electrode may be a drain electrode. In cases that transistors with opposite polarities are used, a current direction changes during operation of a circuit, or the like, functions of the "source electrode" and the "drain electrode" are sometimes interchangeable. Therefore, the "source electrode" and the "drain electrode" are interchangeable in the specification.

In the specification, "electrical connection" includes a case that constituent elements are connected together through an element with a certain electrical effect. The "element with the certain electrical effect" is not particularly limited as long as electrical signals may be sent and received between the connected constituent elements. Examples of the "element with the certain electrical effect" not only include electrodes and wirings, but also include switch elements such as transistors, resistors, inductors, capacitors, other elements with various functions, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

In the specification, a "film" and a "layer" are interchangeable. For example, a "conductive layer" may be replaced with a "conductive film" sometimes. Similarly, an "insulation film" may be replaced with an "insulation layer" sometimes.

In this specification, "being disposed in a same layer" refers to a structure formed by patterning two (or more than two) structures through a same patterning process, and their materials may be the same or different. For example, materials of precursors forming multiple structures disposed in a same layer are the same, and resultant materials may be the same or different.

Triangle, rectangle, trapezoid, pentagon and hexagon in this specification are not strictly defined, and they may be approximate triangle, rectangle, trapezoid, pentagon or hexagon, etc. There may be some small deformation caused by tolerance, and there may be chamfer, arc edge and deformation, etc.

In the present disclosure, "about" refers to that a boundary is defined not so strictly and numerical values within process and measurement error ranges are allowed.

Figure 1:
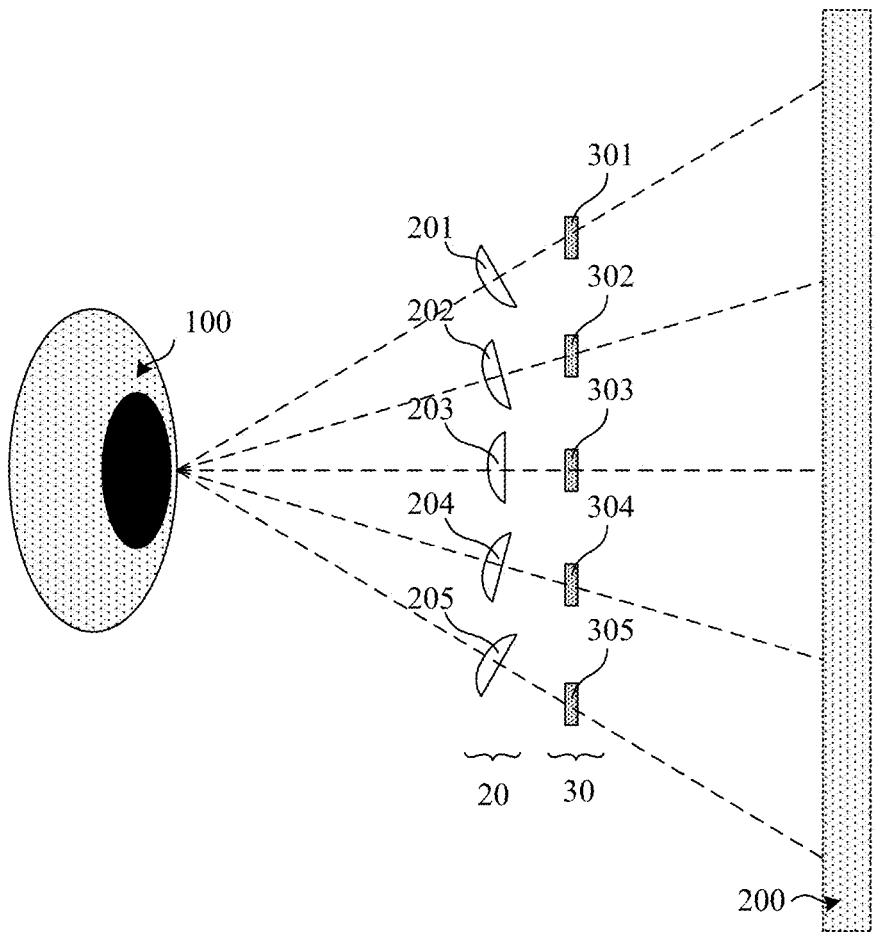
FIG. 1 is a schematic diagram of a structure of a near-eye display device.
Figure 2:
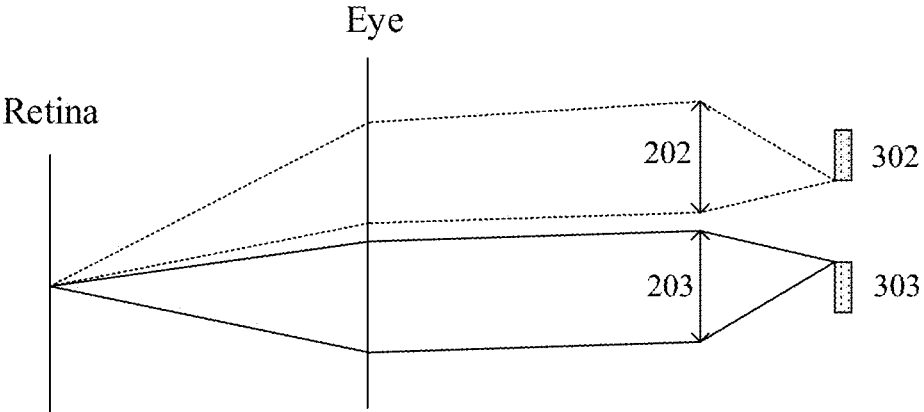
FIG. 2 is a diagram of principle of near-eye display.

FIG. 1 is a schematic diagram of a structure of a near-eye display device, illustrating a splicing imaging scheme using a combination of a microlens array and a pixel island array, and FIG. 2 is a diagram of principle of near-eye display. As shown in FIG. 1, the near-eye display device may include a microlens array 20 and a pixel island array 30, and the microlens array 20 is disposed between an eye 100 and the pixel island array 30. In an exemplary implementation, the microlens array 20 may include a plurality of microlenses (microlens 201 to microlens 205). The microlenses may be one or more of geometric lens, binary diffractive lens, and holographic planar lens, and the microlenses may have a diameter of 0.1 mm to 3 mm. The pixel island array 30 may include a plurality of pixel islands (pixel island 301 to pixel island 305) disposed in correspondence with microlens 201 to microlens 205. Each pixel island is equivalent to a tiny display screen, which may include a plurality of sub-pixels. Light emitted by the plurality of sub-pixels enters the eye 100 through the corresponding microlenses, and forms an enlarged virtual image 200 at a certain depth of field in front of the eye 100. The plurality of pixel islands may be arranged according to viewing requirements of the eye 100. For a complete picture to be viewed by a viewer, each pixel island displays only a portion of image in the complete picture. By designing the positional arrangement of the pixel islands and the microlenses, virtual images of all the pixel islands may be formed at a same depth of field, and a virtual image 200 formed by images of all the pixel islands may be spliced into a complete virtual image in the same depth of field to realize splicing of the field of view.

When implementing the splicing of the field of view, it is necessary for light emitted from edges of adjacent pixel islands to enter the eye at a same angle. As shown in FIG. 2, for a pixel island 302 and a pixel island 303 which are adjacent, an angle at which light emitted from an upper edge of the pixel island 303 is amplified by the microlens 203 to generate parallel light entering the eye is equal to an angle at which light emitted from a lower edge of the pixel island 302 is amplified by the microlens 202 to generate parallel light entering the eye. For a microlens and a subset of pixel island sets (a subset includes multiple pixel islands), if they can all generate a light beam at a certain angle (such as 0°), and all of the light beams can enter the pupil of the eye, then the light produces a same virtual image point for the eye (such as a virtual image point at infinity corresponding to a field of view of 0°).

Researches show that because there is a certain distance (referred to as a placement height) between the microlens array 20 and the pixel island array 30, it is necessary to provide a corresponding dislocation between a microlens and a corresponding pixel island to achieve different angle deflection of light emitted from different pixel islands, and a complete picture is obtained by splicing through off-axis imaging. At present, a maximum off-axis imaging angle of microlens has a certain limit. For example, when the placement height is 10 mm, the maximum off-axis imaging angle is about ±10°. Therefore, limited by the maximum off-axis imaging angle of a single microlens, the near-eye display device with the existing structure cannot achieve a large field-of-view angle.

In order to increase the field-of-view angle of the near-eye display device, related technologies provide various technical schemes. For example, one technical scheme is to use curved substrate, and use a bending angle of the curved substrate to increase the field-of-view angle. However, the use of the curved substrate will increase a thickness of the near-eye display device, which is inconsistent with a development trend of thinness. Moreover, the processing technology of curved substrate is complex, difficult and costly. For another example, another technical scheme is to add a holographic volume grating structure to the microlens to diffract and deflect light having passed through the microlens. Because a sub-grating corresponding to a period or grating vector direction needs to be designed at each pixel island position, this scheme is not only complex in design and difficult in processing, but also requires high collimation of a light source. For another example, another technical scheme is to add a deflection prism to the lens. Because of high processing requirements of a microlens array, this scheme involves difficult processing and will affect an overall size of the system.

An embodiment of the present disclosure provides a near-eye display device. In an exemplary implementation, the near-eye display device includes a substrate, a metalens array disposed on a side of the substrate close to an eye, and a pixel island array disposed on a side of the substrate away from the eye. The pixel island array includes a plurality of pixel islands, the metalens array includes a plurality of metalenses which are in one-to-one correspondence with the plurality of pixel islands, and an orthographic projection of a lens center of a metalens on the substrate is overlapped with an orthographic projection of a pixel center of the respective pixel island on the substrate.

In an exemplary implementation, the lens center of the metalens may be a geometric center of the metalens, and the pixel center of the pixel island may be a geometric center of the pixel island.

Figure 3:
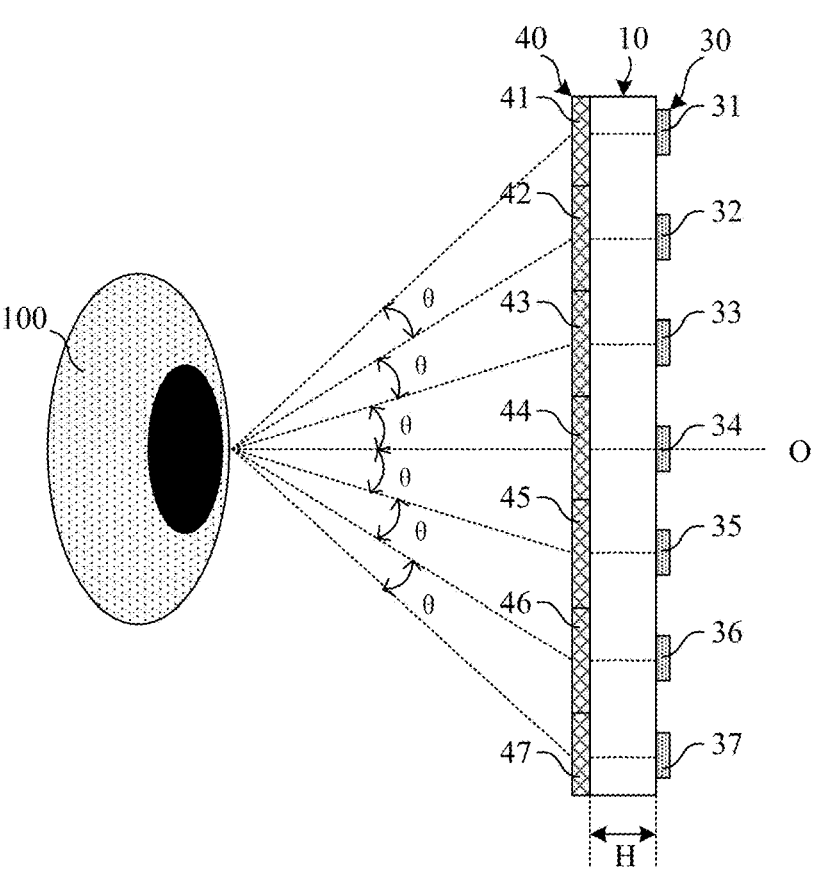
FIG. 3 is a schematic diagram of a structure of a near-eye display device according to an exemplary implementation of the present disclosure.

FIG. 3 is a schematic diagram of a structure of a near-eye display device according to an exemplary implementation of the present disclosure. As shown in FIG. 3, the near-eye display device may include a substrate 10, a metalens array 40 disposed on a side of the substrate 10 close to an eye 100 and a pixel island array 30 disposed on a side of the substrate 10 away from the eye 100. In an exemplary implementation, the substrate 10 may be a carrier constructed of a transparent material and configured to carry the metalens array 40 and to achieve transmission of light as a placement height H. The pixel island array 30 may include a plurality of pixel islands (first pixel island 31 to seventh pixel island 37) arranged at intervals, each pixel island may be equivalent to a tiny display screen, displaying a part of images in a complete picture, and pictures displayed by the plurality of pixel islands may be spliced into a complete picture at the position of the human eye after optical path design. The metalens array 40 may include a plurality of metalenses (first metalens 41 to seventh metalens 47) arranged at intervals, each of which is configured to have both an imaging function and a light deflection function. A phase expressed by a metalens is an imaging lens phase and a deflection phase required at a corresponding pixel island position, and imaging without off-axis phase difference is performed for light rays with different deflection requirements.

In an exemplary implementation, the substrate 10 may be made of a material such as glass, ceramics, quartz or the like or may be made of a silicon compound such as silicon nitride $Si_3N_4$ or the like. In order to reduce a weight of the whole near-eye display device, the substrate may be made of a lighter transparent material, such as polymethyl methacrylate (PMMA), also known as acrylic or plexiglass. Each pixel island may include a plurality of pixels of a same color (one pixel includes at least one sub-pixel) to form a pixel cluster, which is equivalent to a tiny display screen composed of pixel clusters. A spacing between pixel islands serves as a transparent area for near-eye display and is used for the entry of external light. In the structure of this embodiment, the pixel island may be a self-luminous display or may be a non-self-luminous display including a backlight module. The pixel island may include any one or more of the following: Liquid Crystal Display (LCD), Organic Light Emitting Diode (OLED), Light Emitting Diode (LED), Inorganic Electroluminescent Display (EL), Field Emission Display (FED), Surface-conduction Electron-emitter Display (SED), Plasma Display Panel (PDP), and Electro phoretic Display (EPD).

In an exemplary implementation, on a plane parallel to the substrate, a metalens may have a lens center, which may be a geometric center of the metalens. On a plane parallel to the substrate, the pixel island may have a pixel center, which may be a geometric center of the pixel island.

In an exemplary implementation, the plurality of pixel islands may include a first pixel island 31, a second pixel island 32, a third pixel island 33, a fourth pixel island 34, a fifth pixel island 35, a sixth pixel island 36, and a seventh pixel island 37, and the plurality of metalenses may include a first metalens 41 corresponding to the first pixel island 31, a second metalens 42 corresponding to the second pixel island 32, a third metalens 43 corresponding to the third pixel island 33, a fourth metalens 44 corresponding to the fourth pixel island 34, a fifth metalens 45 corresponding to the fifth pixel island 35, a sixth metalens 46 corresponding to the sixth pixel island 36, and a seventh metalens 47 corresponding to the seventh pixel island 37.

In an exemplary implementation, a case that an orthographic projection of a lens center of a metalens on the substrate 10 being substantially overlapped with an orthographic projection of a pixel center of a pixel island on the substrate 10 may include any one or more of the following: an orthographic projection of a lens center of the first metalens 41 on the substrate 10 is substantially overlapped with an orthographic projection of a pixel center of the first pixel island 31 on the substrate 10, an orthographic projection of a lens center of the second metalens 42 on the substrate 10 is substantially overlapped with an orthographic projection of a pixel center of the second pixel island 32 on the substrate 10, an orthographic projection of a lens center of the third metalens 43 on the substrate 10 is substantially overlapped with an orthographic projection of a pixel center of the third pixel island 33 on the substrate 10, an orthographic projection of a lens center of the fourth metalens 44 on the substrate 10 is substantially overlapped with an orthographic projection of a pixel center of the fourth pixel island 34 on the substrate 10, an orthographic projection of a lens center of the fifth metalens 45 on the substrate 10 is substantially overlapped with an orthographic projection of a pixel center of the fifth pixel island 35 on the substrate 10, an orthographic projection of a lens center of the sixth metalens 46 is substantially overlapped with an orthographic projection of a pixel center of the sixth pixel island 36, and an orthographic projection of a lens center of the seventh metalens 47 on the substrate 10 is substantially overlapped with an orthographic projection of a pixel center of the seventh pixel island 37 on the substrate 10.

In an exemplary implementation, three points, i.e., the center of the eye 100, the lens center of the fourth metalens 44, and the pixel center of the fourth pixel island 34, are collinear, and a line connecting the three points: the center of the eye 100, the lens center of the fourth metalens 44, and the pixel center of the fourth pixel island 34, is referred to as a central line of sight O. An orthographic projection of lens centers of the metalenses on the substrate being substantially overlapped with an orthographic projection of pixel centers of the pixel islands on the substrate may be understood as that the lens center of each metalens is in one-to-one correspondence to and aligned with a pixel center of a pixel island regulated by the metalens, and the connecting line between the lens center and the pixel center is parallel to the central line of sight O.

In an exemplary implementation, each pixel island may be disposed at a focal point of a corresponding metalens.

In an exemplary implementation, the metalens may be formed by arranging metasurface units whose scale is smaller than a wavelength of incident light according to a certain arrangement rule, and the metasurface units can accurately modulate phase of incident light with their micro-nano structure optical modulation characteristics, thereby achieving the imaging function and the light deflection function of the metalens. As a new type of optical control element, the metalens can implement the phase modulation of light through sub-wavelength unit structure. The whole device may express the required phase of the light control device through a large number of unit structures, so as to output the whole device performance. Since the metasurface unit has a high degree of design freedom and its own advantages in scale (structure thickness of 100 nanometers), it can break through the processing difficulty of traditional optical components, avoid the limitation of traditional geometrical optics theory, and meet any requirement of light field modulation. With the metasurface unit, ultra-thin, flat and aberration-free optical devices may be manufactured on a smaller scale by simple process. The metasurface unit has characteristics of high designability, small structure size, high integration and capability of accurate light control design.

In an exemplary implementation, the metalens implements the light field modulation by using the metasurface units to express a required light field modulation phase surface, so that the light has the required modulation effect after passing through the metalens.

Figure 4A:
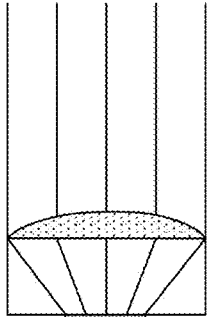
FIG. 4a is a schematic diagram of modulation effect of a metalens when expressing lens phases.
Figure 4B:
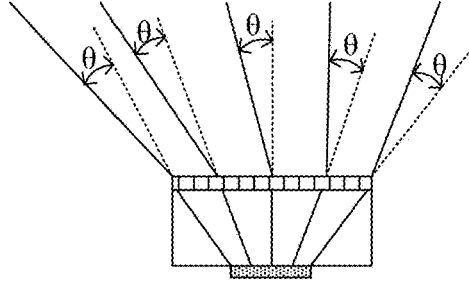
FIG. 4b is a schematic diagram of modulation effect of a metalens when expressing deflected grating phases.

FIG. 4a is a schematic diagram of modulation effect of a metalens when expressing lens phases. As shown in FIG. 4a, the metalens may can achieve a modulation effect of light beam convergence or divergence when expressing lens phases. FIG. 4b is a schematic diagram of modulation effect of a metalens when expressing deflection grating phases. As shown in FIG. 4b, the metalens can achieve a modulation effect of light beam deflection when expressing deflection grating phases. FIG. 4c is a schematic diagram of modulation effect of a metalens when expressing lens phases and deflection grating phases. By combining the lens phase expression with the deflection grating phase expression of the metalens, and superimposing the lens phase information and the deflection grating phase information of the metalens, the metalens can have expression characteristics of expressing the lens phases and the deflection grating phases. As shown in FIG. 4c, when the metalens expresses the lens phases and the deflection grating phases, the metalens may not only achieve the modulation effect of light beam convergence or divergence, but also achieve the modulation effect of light beam deflection, and finally achieve the modulation effect required by the metalens on light, which has a high degree of freedom in modulation effect design.

In an exemplary implementation, when the metalens expresses the lens phases and the deflection grating phases, its phase expression is:

$$\varphi(x,y)=-2\pi(\sqrt{(x^2+y^2)+f^2}-f)/\lambda+2\pi(x\cos\varphi+y\sin\varphi)\sin\theta/\lambda \quad (1)$$

where (x, y) is a coordinate of different position points on the metalens, a center of the metalens is the coordinate origin, $\varphi$(x, y) is the phase at a position point (x, y) on the metalens, $\lambda$ is a wavelength of incident light, f is a focal length of the metalens, which is related to a placement height of the lens, $\Phi$ is the coordinate azimuth angle of the pixel island corresponding to the metalens, and $\theta$ is a light deflection angle required by a pixel island corresponding to the metalens.

In an exemplary implementation, $-2\pi(\sqrt{(x^2+y^2)+f^2}-f)/\lambda$ may be expressed as the lens phase information. When the wavelength of incident light and the focal length f of the metalens are constant, an absolute value of the lens phase is proportional to a radius at the position point on the metalens.

In an exemplary implementation, $2\lambda(x\cos\varphi+y\sin\varphi)\sin\theta/\lambda$ may be expressed as the deflection grating phase information. When the coordinate azimuth angle $\Phi$ of the pixel island corresponding to the metalens is constant, an absolute value of the deflection grating phase is proportional to the required deflection angle $\theta$ of the pixel island. For example, since a light deflection angle required by the first pixel island 31 is larger than a light deflection angle required by the second pixel island 32, a deflection grating phase of the first metalens 41 corresponding to the first pixel island 31 is larger than a deflection grating phase of the second metalens 42 corresponding to the second pixel island 32.

In an exemplary implementation, the metasurface unit may be a metallic microstructure or a dielectric microstructure which has a size smaller than the wavelength constructed on a base substrate. For example, a material of the base substrate may be a silicon oxide (SiOx), a material of the dielectric microstructure may be a silicon nitride (SiN$_x$), and there is a large refractive index difference between the base substrate and the dielectric microstructure. For example, the refractive index difference between silicon oxide and silicon nitride may be greater than or equal to 0.5.

Phase modulation of a metasurface unit may include metasurface modulation of transmission phase type, which introduces change of equivalent refractive index to form phase delay based on different scale changes of unit structure (including height, width, diameter, etc.), metasurface modulation of geometric type, which introduces phase difference of polarization component electromagnetic field based on a same unit structure and different rotation angles, and hybrid phase modulation principle achieved by combining the above two types. The phase modulation of the metasurface unit based on transmission phase design may be understood as the phase difference caused by transmission of light in structures with different aspect ratios.

In an exemplary implementation, the phase change caused by light transmission within the metasurface unit is proportional to the equivalent refractive index and a propagation distance of the metasurface unit. For a metasurface unit with a nano-column structure, when a radius of nano-column changes, the equivalent refractive index of the metasurface unit changes immediately, so a phase delay value of light passing through the metasurface unit may be adjusted by adjusting the radius of the nano-column.

FIG. 5 is a schematic diagram of a structure of a metasurface unit according to an exemplary implementation of the present disclosure. As shown in FIG. 5, the metasurface unit may include a base substrate 51 and a column 52 disposed on the base substrate 51, wherein the base substrate 51 may be made of silicon dioxide ($SiO_2$), and the column 52 may be made of silicon nitride ($SiN_x$), and the column 52 has a height h of about 500 nm to 800 nm, and a radius r of about 55 nm to 125 nm.

In an exemplary implementation, the column may be a cylinder. In some possible exemplary implementations, the column may be an elliptical column, a triangular column, a rectangular column, or a polygonal column, which is not limited here in the present disclosure.

In an exemplary implementation, a phase change of the light field is a continuous change between $2\pi$ ($360°$ phase change). By traversing parameters of the metasurface unit, a plurality of metasurface units including $2\pi$ phase change at different wavelengths may be obtained to form a basic structure database. The basic structure database includes column structures with different heights and different radii and phase information corresponding to these column structures respectively, and the phase information covers the range from 0 to $2\pi$. Corresponding metalenses may be constructed according to different requirements of phase modulation by using the basic structure database.

In an exemplary implementation, in order to simplify computational complexity of constructing a metalens and improve a construction efficiency, a lens structure database may be constructed on the basis of the basic structure database. The lens structure database includes column structures of a same height, n radii, and basic phase information corresponding to the n column structures respectively, and corresponding metalenses may be constructed using the lens structure database, where n may be a positive integer greater than or equal to 2.

In an exemplary implementation, the phases in a range of 0 to $2\pi$ may be divided according to a phase step size of $\pi/4$, resulting in 8 basic phases, which are respectively: 0, $\pi/4$, $\pi/2$, $3\pi/4$, $\pi$, $5\pi/4$, $3\pi/2$ and $7\pi/4$. 8 column structures corresponding to the 8 basic phases are selected from the basic structure database to construct the lens structure database. Therefore, the lens structure database includes the 8 basic phases and the 8 column structures corresponding to the basic phases.

In an exemplary implementation, the smaller the phase step size, the finer the resultant lens structure database, but the more complex the calculation and processing. Selection of the phase step size of $\pi/4$ may not only ensure that the metalens may cover the required phase information, but also facilitate calculation and subsequent fabrication. In an exemplary implementation, the phase step size may be the same or may be different, which is not limited here in the present disclosure.

FIG. 6 is a schematic diagram of a lens structure database according to an exemplary implementation of the present disclosure, illustrating a plurality of metasurface units for a wavelength of 620 nm. As shown in FIG. 6, the lens structure database may include 8 basic phases and 8 column-shaped metasurface units corresponding to the basic phases. The 8 metasurface units include $SiN_x$ nano-columns with a height of 800 nm and radii of 55 nm, 75 nm, 85 nm, 90 nm, 100 nm, 105 nm, 110 nm, and 125 nm, respectively on a $SiO_2$ substrate, and the basic phases of the 8 metasurface units are $0°$, $32°$, $90°$, $178°$, $235°$, $266°$, $316°$, and $329°$ respectively.

In an exemplary implementation, since different metasurface units have different phase delay values, corresponding metalenses may be constructed for different requirements of phase modulation by arranging the plurality of metasurface units at a set unit period. In an exemplary implementation, the unit period may be a distance between centers of adjacent metasurface unit and may be about 200 nm to 300 nm. For example, the unit period may be about 250 nm.

In an exemplary implementation, the construction process of the metalens may include following steps:

constructing a lens structure database, wherein the lens structure database includes a plurality of basic phases and a plurality of metasurface units corresponding to the plurality of basic phases;

acquiring phases at different positions on a metalens, wherein the metalens is configured to have both an imaging function and a light deflection function;

determining metasurface units at different regional positions on the metalens according to the phases at different positions on the metalens and the lens structure database; and constructing the metalens by using the metasurface units at different regional positions on the metalens.

In an exemplary implementation, the step of constructing the lens structure database may include:

constructing a basic structure database, wherein the lens structure database includes a plurality of metasurface units whose phase information covers a range of 0 to $2\pi$;

obtaining a plurality of basic phases according to a preset phase selection strategy; and selecting a plurality of metasurface units corresponding to the plurality of basic phases from the basic structure database to form a lens structure database.

In an exemplary implementation, each metasurface unit may have a column structure, the constructed basic structure database may include a plurality of column structures with different heights and different radii, the column structures have corresponding phase information, and the phase information covers the range of 0 to $2\pi$.

In an exemplary implementation, in order to facilitate subsequent processing and improve a construction efficiency of the metalens, the metasurface units in the basic structure database may be selected according to a height of an actual machinable column and a theoretically optimal principle when constructing the lens structure database. For example, metasurface units with a same height may be selected.

In an exemplary implementation, the preset phase selection strategy may be a preset phase step size or may be a preset phase value. For example, the preset phase selection strategy may be to select the basic phases by a phase step size of $\pi/4$ in the range of 0 to $2\pi$. For another example, the preset phase selection strategy may be to select the phases with the phase value being $0°$, $32°$, $90°$, $178°$, $235°$, $266°$, $316°$, and $329°$ respectively in the range of 0 to $2\pi$ as the basic phases.

In an exemplary implementation, after obtaining the plurality of basic phases, metasurface units corresponding to the plurality of basic phases may be selected from the basic structure database to form the lens structure database. For example, when the basic phases are 0°, 32°, 90°, 178°, 235°, 266°, 316°, and 329° respectively, the radii of the 8 corresponding metasurface units are 55 nm, 75 nm, 85 nm, 90 nm, 100 nm, 105 nm, 110 nm and 125 nm respectively, and the heights of the 8 metasurface units are all 800 nm.

In an exemplary implementation, the step of acquiring the phases at different positions on the metalens may include: obtaining the phases at different positions on the metalens according to a lens phase formula (1).

Figure 7:
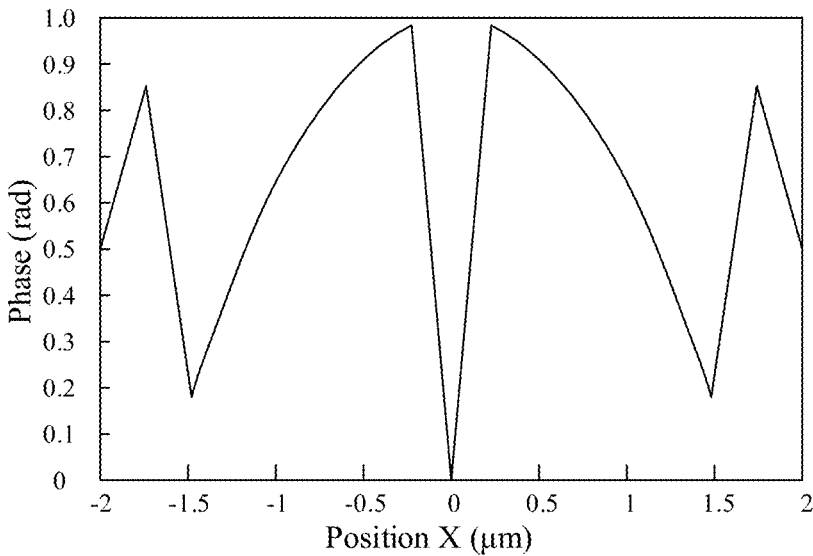
FIG. 7 is a schematic diagram of phases at different positions on a metalens.

In an exemplary implementation, taking the first metalens 41 as an example, acquiring the phases at different positions on the metalens may include: first, a two-dimensional coordinate system is established on the first metalens 41, with a geometric center of the first metalens 41 being a coordinate origin. Then, a design wavelength is selected, which may be a wavelength of red light, a wavelength of green light, or a wavelength of blue light. For example, 620 nm may be selected as the design wavelength. Subsequently, the phases at different positions on the first metalens 41 at the design wavelength of 620 nm are calculated using the lens phase formula (1), as shown in FIG. 7. FIG. 7 is a schematic diagram of phases at different positions on a metalens.

In an exemplary implementation, the step of determining the metasurface units at different regional positions on the metalens according to the phases at different positions on the metalens and the lens structure database may include: discretizing the phases at different positions on the metalens, acquiring phases at different regional positions on the metalens, and determining the metasurface units at different regional positions on the metalens according to the phases at different regional positions on the metalens and the lens structure database.

Figure 8:
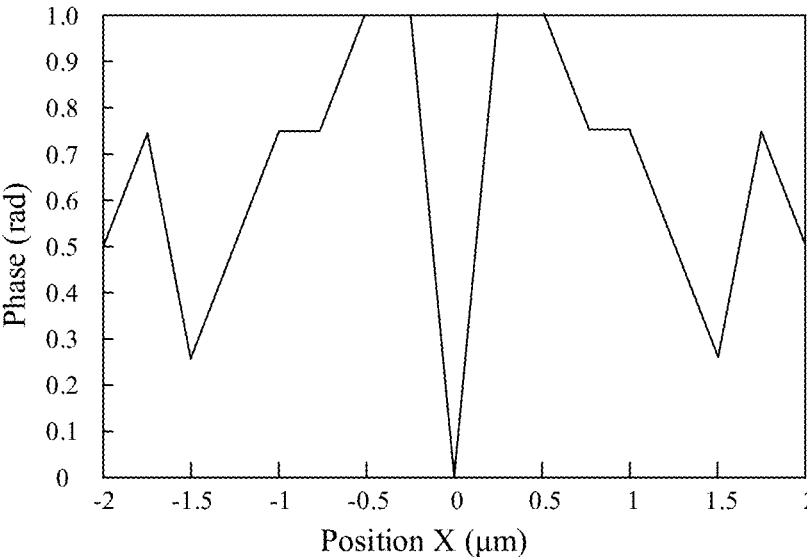
FIG. 8 is a schematic diagram of discretized phases on a metalens.

In an exemplary implementation, taking the first metalens 41 as an example, the step of determining the metasurface units at different regional positions on the metalens may include: first, different regions are divided on the first metalens 41, with coordinates of center points of the regions as the regional positions, phases of the positions in the regions are discretized, and the phases at different regional positions on the metalens are acquired, as shown in FIG. 8. FIG. 8 is a schematic diagram of discretized phases on a metalens. In an exemplary implementation, a unit period of the metasurface unit may be used as a minimum division scale, the discretization may be carried out according to a size of the unit period of the metasurface unit, and a discretized phase may be a phase of the coordinate of the center point of the regions, or an average value of the phases of the positions within the region, which is not limited herein the present disclosure. Subsequently, the acquired phase at a certain regional position on the first metalens 41 is compared with the basic phases in the lens structure database to obtain a basic phase closest to the phase. In an exemplary implementation, in order to select a more suitable metasurface unit, the principle of matching nearby may be employed to obtain a basic phase closest to the phase. Then, a metasurface unit corresponding to the basic phase is selected from the structure database, so as to obtain the metasurface unit at the regional position on the metalens. By repeating this process, the metasurface units in all regional positions on the metalens may be obtained.

Figure 9:
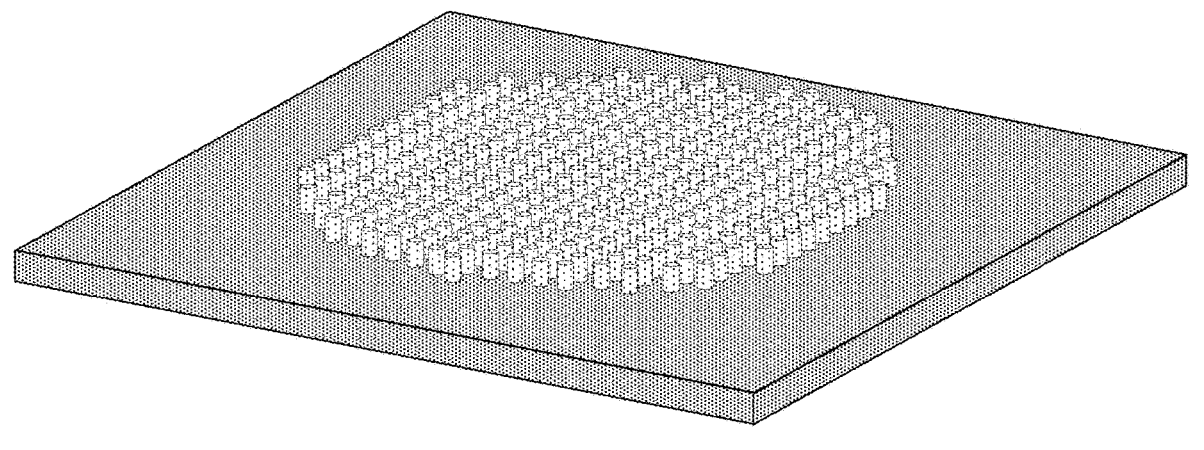
FIG. 9 is a schematic diagram of a metalens constructed by metasurface units.

In an exemplary implementation, the step of constructing the metalens according to the metasurface units at different regional positions on the metalens may include: performing structural filling at different regional positions on the metalens by using the acquired metasurface units at different regional positions, so as to construct the metalens. Phase information corresponding to different regional positions on the metalens may be used to realize that the metalens has both imaging function and light deflection function, as shown in FIG. 9. FIG. 9 is a schematic diagram of a metalens constructed by metasurface units.

In an exemplary implementation, a plurality of metalenses may have the same imaging lens characteristics, i.e., have the same lens aperture and focal length, corresponding to different pixel islands. According to a required deflection angle, a corresponding metalens has corresponding deflection angle characteristics, so as to achieve the deflection of pixel island imaging without off-axis, and finally achieve seamless splicing on human retina. As shown in FIG. 3, the first metalens 41 to the seventh metalens 47 have a same range of display field-of-view, a deflection angle of the fourth metalens 44 on the central line of sight O is 0, a deflection angle of the third metalens 43 and a deflection angle of the fifth metalens 45 on an outer side of the fourth metalens 44 (away from the central line of sight O) are θ, a deflection angle of the second metalens 42 on an outer side of the third metalens 43 and a deflection angle of the sixth metalens 46 on an outer side of the fifth metalens 45 are 2θ, and a deflection angle of the first metalens 41 on an outer side of the second metalens 42 and a deflection angle of the seventh metalens 47 on an outer side of the sixth metalens 46 on the outer side of the sixth metalens 46 are 3θ.

In an exemplary implementation, according to the structure design of the near-eye display device, parameters such as the placement height H and the focal length f of the metalens may be obtained, and according to positions of the first metalens 41 to the seventh metalens 47, parameters such as a coordinate azimuth angle Φ of the pixel island corresponding to the metalens, a required light deflection angle θ of the corresponding pixel island, a wavelength λ of the incident light and the like may be obtained. Then, phase expression of each lens may be calculated by formula (1), the metalens may be constructed according to a phase expression of each lens, and the metalens equivalent to a corresponding optical modulation effect may be finally obtained by using the metasurface unit of the corresponding phase in the lens structure database for structure filling.

According to the metalens array provided by the exemplary implementation of the present disclosure, since the thickness of the metalens is less than or equal to about 800 nm, it effectively reduces the lens thickness compared with a conventional microlens array with a thickness of about 2 μm, which is conducive to thinness and lightness of the near-eye display device. The metalens provided by the present disclosure has both the imaging function and the light deflection function, which effectively avoids larger aberration caused by off-axis imaging and may ensure imaging quality with different deflection angles compared with the traditional dislocation imaging deflection structure. Because the metalens is the transmission formula expression of an ideal lens, compared with the traditional geometric lens, it effectively avoids an aberration problem caused by uneven lens processing.

FIG. 10 is a schematic diagram of a metalens array according to an exemplary implementation of the present disclosure. In an exemplary implementation, a monochrome pixel island splicing scheme constructed based on an 8 mm×8 mm OLED back plate is taken as an example, depending on requirements of a pixel island size (e.g., 3.308 mm), a pixel size (e.g., 3.96 μm) and a human eye resolution, the metalens array may include 3×3 metalenses arranged in a matrix, a diameter (aperture) D of each metalens may be about 0.7 mm, spacing (unit period) L between adjacent metalenses may be about 2.807 mm, a focal length of each metalens may be about 5 mm, and a central field-of-view angle of each metalens may be about 5.725°.

As shown in FIG. 10, deflection angle information of the metalenses may be obtained based on their positions. For example, a deflection angle of the first lens T1 may be 0°. The second lens T2 and the third lens T3 may have a horizontal deflection angle of 5.725°, and a vertical deflection angle of 0°. The fourth lens T4 and the fifth lens T5 may have a horizontal deflection angle of 0°, and a vertical deflection angle of 5.725°. The sixth lens T6, the seventh lens T7, the eighth lens T8, and the ninth lens T9 may have a horizontal deflection angle of 5.725°, and a vertical deflection angle of 5.725°.

Figure 11A:
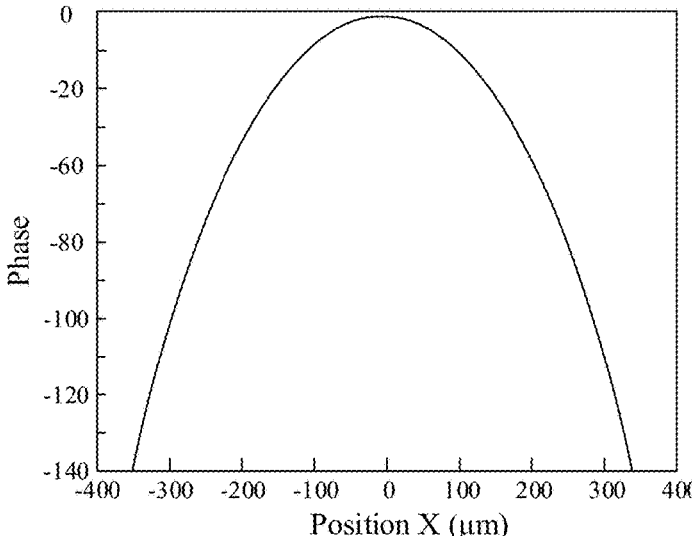
FIGS. 11a to 11c are schematic diagrams of phase and structure of a metalens deflected at an angle of 0°.
Figure 11B:
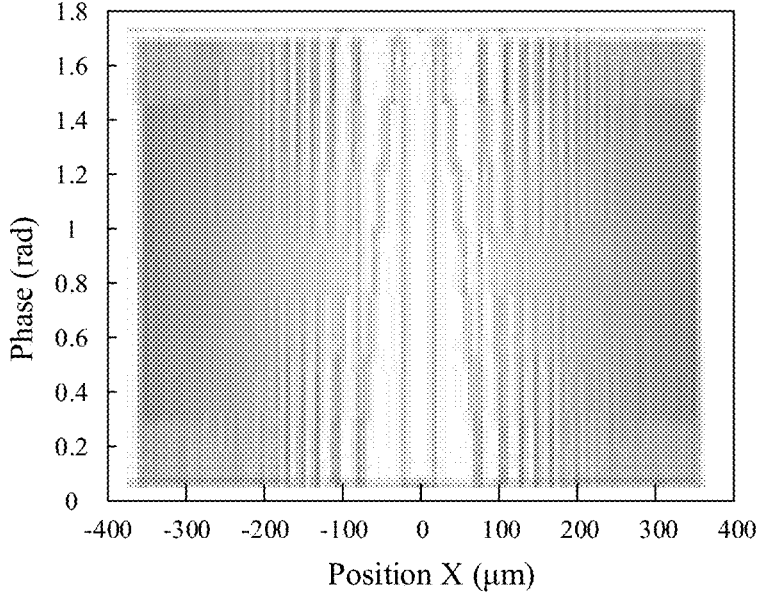
Figure 11C:
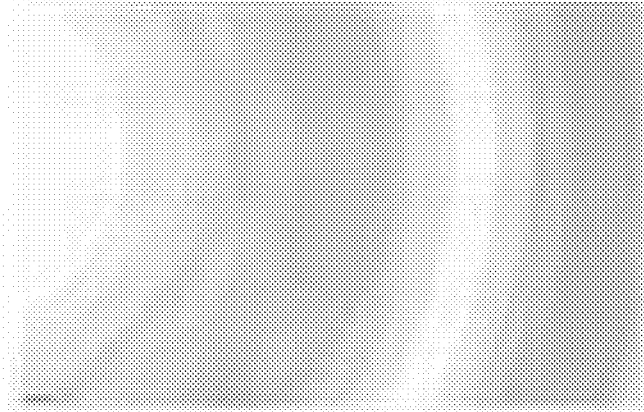
Figure 12A:
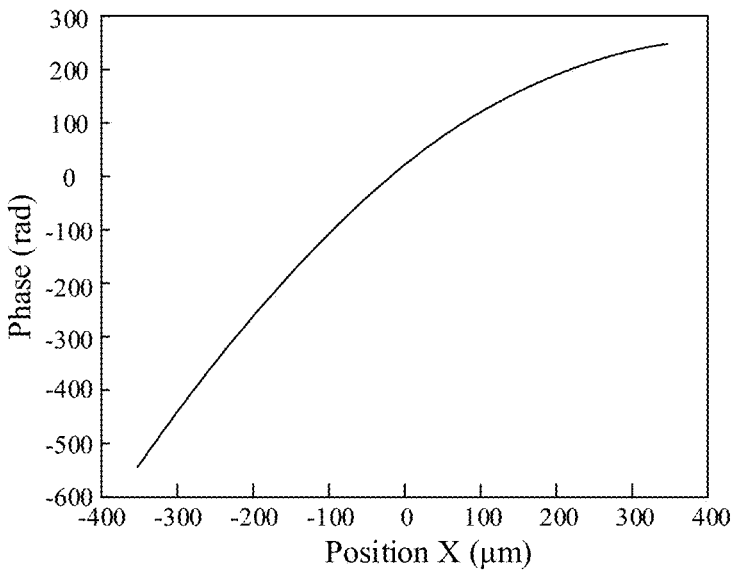
FIGS. 12a to 12c are schematic diagrams of phase and structure of a metalens deflected at an angle of 5.725°.
Figure 12B:
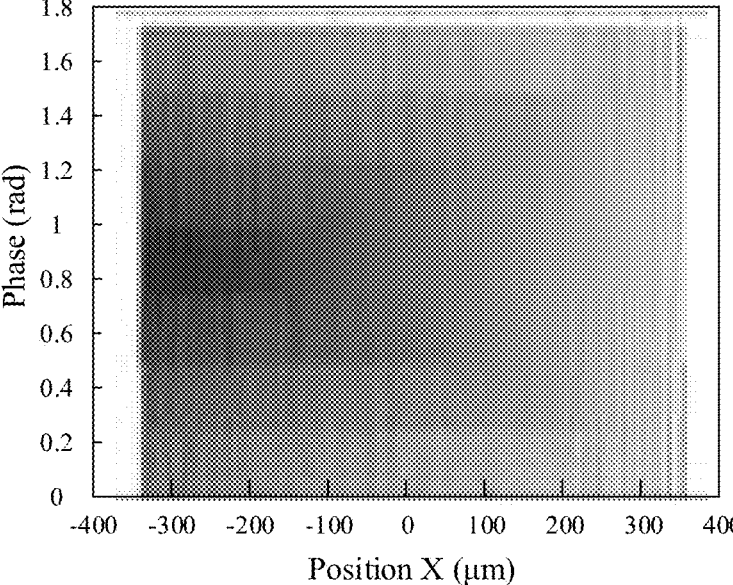
Figure 12C:
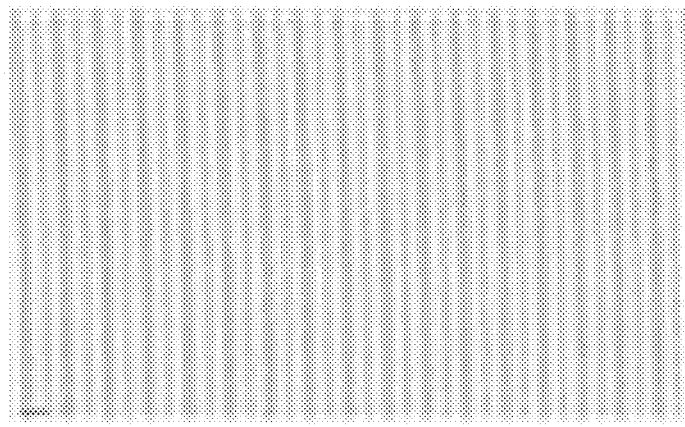

In an exemplary implementation, according to parameter information of the near-eye display device and the metalens, a structural design of the metalens for monochromatic deflection imaging with deflection angles of 0° and 5.725° may be performed. FIG. 11a to FIG. 11c are schematic design diagrams of a metalens with an additional deflection angle of 0°. FIG. 11a is a schematic diagram of phase distribution of a lens at 0° field of view, which is calculated by formula $-2\pi(\sqrt{(x^2+y^2)}+f^2-f)/\lambda$. Because phase distribution of the lens is a multiple of $2\pi$, in order to express it in the metasurface unit covering the phase range of $2\pi$, it is necessary to take the remainder of the lens phase distribution to $2\pi$ and fold it in the range of 0 to $2\pi$. FIG. 11b is a schematic diagram of phase distribution of a metalens at 0° field of view in the range of 0 to $2\pi$. Phase discretization is carried out according to a period of the metasurface unit, and metasurface units with corresponding phase modulation values are placed at corresponding coordinates to obtain a final metalens structure. FIG. 11c is a structure of a metalens at 0° field of view, which is a partial top view of the metalens, and the top view presents a circle a corresponding radius. FIGS. 12a to 12c are design schematic diagrams of a metalens with an additional deflection angle of 5.725°. FIG. 12a is a schematic diagram of phase distribution of a lens at 5.725° field of view, FIG. 12b is a schematic diagram of phase distribution of a metalens at 5.725° field of view in the range of 0 to $2\pi$, and FIG. 12c is a structure of a metalens at 5.725° field of view, which is a partial top view of the metalens. A design flow of FIGS. 12a to 12c is similar to that of FIGS. 11a to 11c, except that the phase distribution is calculated by formula (1).

Figure 13A:
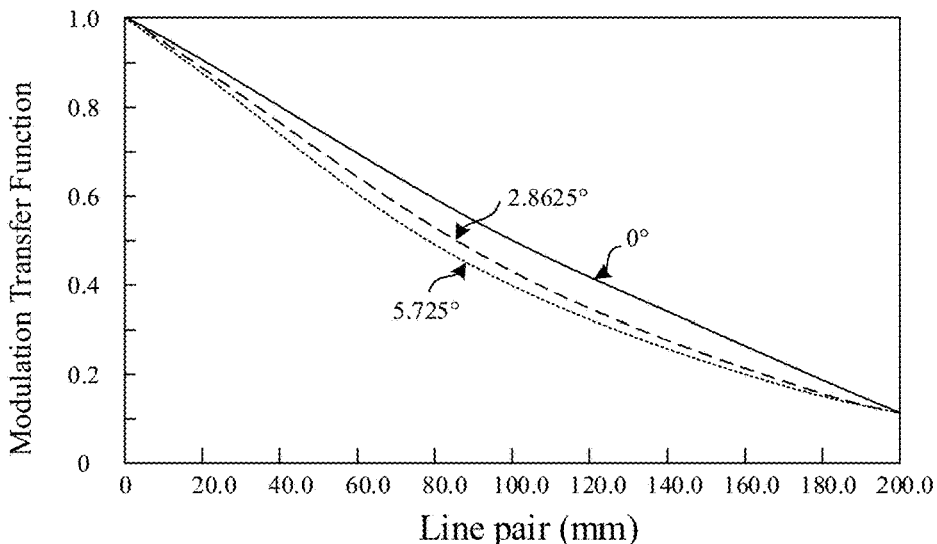
FIG. 13a is an MTF curve of a geometric lens imaging at 5.725° field of view.
Figure 13B:
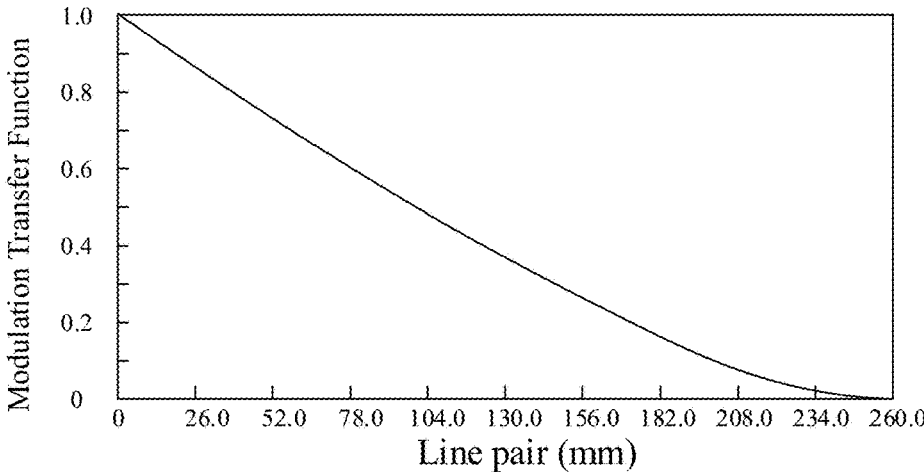
FIG. 13b is an MTF curve of a metalens imaging at 5.725° field of view.

FIG. 13a is an MTF curve of a geometric lens imaging at 5.725° field of view as a function of resolution, FIG. 13b is an MTF curve of a metalens imaging at 5.725° field of view as a function of resolution, FIG. 14a is an MTF curve of a geometric lens imaging at 5.725°+5.725° field of view as a function of resolution, FIG. 14b is an MTF curve of a metalens imaging at 5.725°+5.725° field of view as a function of resolution, and the line pair of the abscissa may reflect a resolution. The 5.725° field of view may be the field of view of the second lens T2 or the third lens T3 (with a horizontal deflection angle of 5.725°), or may be the field of view of the fourth lens T4 or the fifth lens T5 (with a vertical deflection angle of 5.725°). The 5.725°+5.725° field of view may be the field of view of the sixth lens T6, the seventh lens T7, the eighth lens T8 or the ninth lens T9 (with a horizontal deflection angle of 5.725°, and a vertical deflection angle of 5.725°). Because a complete picture is spliced by the geometric lens through off-axis imaging, there is a risk of off-axis aberration. As shown in FIGS. 13a and 14a, from the Modulation Transfer Function (MTF) curves of a geometric lens imaging at 5.725° field of view and 5.725°+

5.725° field of view respectively, it can be seen that there is a big difference in the MTF curves as a function of resolution between a sagittal plane and a meridian plane of a most edge (5.725°), sub-edge (2.8625°) and central field of view (0°) in the geometric lens, and an imaging quality of edge light is significantly lower than that of central light. In the present disclosure, off-axis aberration is eliminated by implementing deflection of pixel island imaging without off-axis using a metalens. As shown in FIGS. 13b and 14b, from the MTF curves of a metalens imaging at 5.725° field of view and 5.725°+5.725° field of view respectively in the present disclosure, it can be seen that the MTF curves of sagittal plane and meridian plane under different field-of-view conditions are coincident, which indicates that the metalens has the same imaging capability at different field-of-view angles and different directions corresponding to the metalens, thus implementing aberration-free imaging. The light imaging quality of the metalens in different fields of view may be kept consistent with that of the central field of view, thus ensuring the imaging quality of different lens control field-of-view ranges. The metalens of the present disclosure is applied to a splicing display system, which avoids the limitation of the overall field-of-view angle of the system caused by the large angle of view aberration of the prior structure, and the scheme of the present disclosure makes it feasible to expand the field-of-view angle.

FIG. 15a is a schematic diagram of splicing display effect of the metalens array shown in FIG. 10, and FIG. 15b is a curve graph of display brightness distribution of the metalens array shown in FIG. 10, where X is a coordinate in the horizontal direction with a center of a spliced picture as the origin, and Y is a coordinate in the vertical direction with the center of the spliced picture as the origin. By simulating the metalens array shown in FIG. 10, simulation results show that the metalens array constructed in the present disclosure may achieve a field-of-view splicing effect with an imaging quality better by about 17° at the human eye (light receiving surface). As shown in FIG. 15a, the brightness fluctuation in X direction and Y direction in the spliced picture is less than 0.5%, which is within a acceptable range of the human eye, as shown in FIG. 15b.

FIG. 16 is a schematic diagram of another metalens array according to an exemplary implementation of the present disclosure, FIG. 17a is a schematic diagram of splicing display effect of the metalens array shown in FIG. 16, and FIG. 17b is a curve graph of display brightness distribution of the metalens array shown in FIG. 16. Since the metalens is not affected by off-axis aberration, the field of view constructed by the metalenses is only limited by a size of the back plate. As long as the size of the back plate is large enough, the metalens array may expand the field of view of the splicing display as much as possible. As shown in FIG. 16, taking a monochrome pixel island splicing scheme constructed based on an 12 mm×12 mm OLED back plate as an example, according to requirements of the pixel island size, pixel size and human eye resolution, the metalens array may include 5×5 metalenses arranged in a matrix, a diameter (aperture) D of each metalens may be about 0.7 mm, a unit period L of the metalenses may be about 2.807 mm, a focal length of each metalens may be about 5 mm, and a central field angle of each metalens is 5.725°. Simulation results show that the metalens array may increase the deflection angle by 11.45°, and achieve a splicing field-of-view angle close to 28°, as shown in FIG. 17a, and the brightness fluctuation is less than 0.5%, as shown in FIG. 17b.

FIG. 18 is a schematic diagram of another metalens array according to an exemplary implementation of the present disclosure, illustrating an array distribution of metalenses during color splicing display. Since the metalenses have the wavelength-selective property, it is necessary to design the red (R) pixel island, the green (G) pixel island and the blue (B) pixel island respectively to implement the splicing display of color pixel islands. As shown in FIG. 18, the metalens array may include 27 metalenses arranged regularly, a diameter (aperture) D of each metalens may be about 0.7 mm, a unit period L of the metalenses may be about 2.807 mm, a focal length of each metalens may be about 5 mm, and a central field-of-view angle of each metalens may be 5.725°.

In an exemplary implementation, among the 27 pixel islands, 3 B pixel islands and 3 R pixel islands may be alternately arranged in the horizontal direction, 3 B pixel islands and 3 G pixel islands may be alternately arranged in the vertical direction, color of sub-pixels in each pixel island is the same, size of the pixel island corresponding to each color is the same as optical parameters of the metalens, and three-color superposition is achieved through the design of a deflection angle of a metalens of a corresponding response wavelength using a principle that light incident at a same angle converges to a same point on the retina of the eye after passing through the eye, so as to realize the coincidence at the imaging plane (human eye), and achieve color display, thereby realizing color splicing display by cooperating with the design of the deflection angle of the metalenses of adjacent pixel islands.

As can be seen from the structure of the near-eye display device of the exemplary implementation of the present disclosure, based on demands of pixel island splicing display devices on enlargement of field-of-view angle, the present disclosure utilizes a high degree of freedom of light field modulation of the metasurface, and proposes a pixel island splicing display scheme which uses a metalens array to realize large-angle off-axis light imaging, and realizes improvement of the field-of-view angle of the splicing display device on the basis of thinness and lightness. Since the metalens array has the properties of aberration-free lens and deflection grating at the same time, the problem of off-axis phase difference of lenses corresponding to pixel islands with a large viewing angle is avoided, dislocation between lenses and pixel islands is no longer needed to ensure splicing imaging, the imaging field-of-view angle of the splicing display device is no longer limited by the off-axis aberration of the lenses and the size of the back plate, which may realize the expansion of the field-of-view angle, has the advantages of thinness, lightness and device integration, and thereby may be applied to the expansion of the field-of-view angle in AR transparent display with thinness and lightness and VR display with thinness and lightness.

An exemplary implementation of the present disclosure further provides a construction method of a metalens. In an exemplary implementation, the construction method of the metalens may include following steps:

S1, constructing a lens structure database, wherein the lens structure database includes a plurality of basic phases and a plurality of metasurface units corresponding to the plurality of basic phases;

S2, acquiring phases at different positions on a metalens, wherein the metalens is configured to have both an imaging function and a light deflection function;

S3, determining metasurface units at different regional positions on the metalens according to the phases at different positions on the metalens and the lens structure database; and S4, constructing the metalens by using the metasurface units at different regional positions on the metalens.

In an exemplary implementation, the step of constructing the lens structure database in step S1 may include:

S11, constructing a basic structure database including a plurality of metasurface units whose phase information covers a range of 0 to $2\pi$;

S12, obtaining a plurality of basic phases according to a preset phase selection strategy; and S13, selecting a plurality of metasurface units corresponding to the plurality of basic phases from the basic structure database to form the lens structure database.

In an exemplary implementation, the step of acquiring the phases at different positions on the metalens in step S2 may include: obtaining the phases at different positions on the metalens according to a lens phase formula, wherein the lens phase formula is:

$$\varphi(x,y) = -2\pi(\sqrt{(x^2+y^2)+f^2} - f)/\lambda + 2\pi(x\cos\varphi + y\sin\varphi)\sin\theta/\lambda$$

where (x, y) is coordinate of different position points on the metalens, a geometric center of the metalens is the coordinate origin, $\varphi$ (x, y) is a phase at the position point (x, y) on the metalens, $\lambda$ is a wavelength of incident light, f is a focal length of the metalens, $\Phi$ is a coordinate azimuth angle of a pixel island corresponding to the metalens, and $\theta$ is a light deflection angle required by the pixel island corresponding to the metalens.

In an exemplary implementation mode, step S3 may include:

S31, discretizing the phases at different positions on the metalens, and acquiring phases of different regions on the metalens; and S31, determining the metasurface units at different regional positions on the metalens according to the phases of different regions on the metalens and the lens structure database.

In an exemplary implementation, step S4 may include: performing structural filling at different regional positions of the metalens by using the acquired metasurface units at different regional positions, so as to construct the metalens.

According to the construction method of the metalens provided by the exemplary implementation of the present disclosure, the metasurface units with corresponding phase modulation values are selected from the lens structure database by calculating and discretizing the phase distribution of the metalens, and the metasurface units are utilized for filling and arrangement, thus constructing the metalens with a corresponding light field modulation effect, which may effectively avoid structure errors in the processing and design process of a traditional geometrical optical device, and achieve the design of the optical device in a small scale range.

An exemplary implementation of the present disclosure further provides a virtual/augmented reality equipment including the aforementioned near-eye display device. The virtual/augmented reality equipment may be virtual/augmented reality head-mounted display, or other devices or equipment with near-eye display function, which may realize large-angle light aberration-free deflection imaging and achieve VR/AR reality equipment with large field-of-view characteristics.

Although the implementations disclosed in the present disclosure are as above, the described contents are only implementations used for convenience of understanding the present disclosure and are not intended to limit the present disclosure. Any one skilled in the art to which the present disclosure pertains, without departing from the spirit and scope disclosed in the present disclosure, may make any modifications and changes in a form and details of implementation. However, the scope of patent protection of the present application should still be subject to the scope defined by the appended claims.

The invention claimed is:

1. A near-eye display device, comprising a substrate, a metalens array disposed on a side of the substrate close to an eye, and a pixel island array located on a side of the substrate away from the eye, wherein the pixel island array comprises a plurality of pixel islands, the metalens array comprises a plurality of metalenses which are in one-to-one correspondence with the plurality of pixel islands, an orthographic projection of a lens center of a metalens on the substrate is overlapped with an orthographic projection of a pixel center of a pixel island on the substrate, the lens center is a geometric center of the metalens, and the pixel center is a geometric center of the pixel island; and wherein the metalens comprises a plurality of metasurface units regularly arranged by a unit period, at least one of the metasurface units comprises a base substrate and a column disposed on the base substrate, and a refractive index of the base substrate is different from a refractive index of the column.

2. The near-eye display device according to claim 1, wherein at least one of the metalenses has an imaging function and a light deflection function, and the metalens satisfies a following lens phase formula:

$$\varphi(x,y) = -2\pi(\sqrt{(x^2+y^2)+f^2}-f)/\lambda + 2\pi(x\cos\varphi + y\sin\varphi)\sin\theta/\lambda$$

where (x, y) is coordinates of different position points on the metalens, a geometric center of the metalens is a coordinate origin, $\varphi$ (x, y) is a phase at a position point (x, y) on the metalens, $\lambda$ is a wavelength of incident light, f is a focal length of the metalens, $\Phi$ is a coordinate azimuth angle of a pixel island corresponding to the metalens, and $\theta$ is a light deflection angle required by the pixel island corresponding to the metalens.

3. The near-eye display device according to claim 1, wherein the plurality of pixel islands are configured to respectively display a part of images in a complete picture, and the plurality of metalenses are configured to modulate an optical path so that images of all of the pixel islands are spliced into the complete picture.

4. The near-eye display device according to claim 1, wherein the plurality of metalenses have a same lens aperture and a same focal length.

5. The near-eye display device according to claim 1, wherein a difference between the refractive index of the base substrate and the refractive index of the column is greater than or equal to 0.5.

6. The near-eye display device according to claim 1, wherein a material of the base substrate comprises a silicon oxide, and a material of the column comprises a silicon nitride.

7. The near-eye display device according to claim 1, wherein a height of the column is from 500 nm to 800 nm.

8. The near-eye display device according to claim 1, wherein the column is a cylinder having a radius of 55 nm to 125 nm.

9. The near-eye display device according to claim 1, wherein the unit period is 200 nm to 300 nm.

10. A construction method of a metalens in the near-eye display device according to claim 1, comprising:

constructing a lens structure database comprising a plurality of basic phases and a plurality of metasurface units corresponding to the plurality of basic phases;

acquiring phases at different positions on a metalens which is configured to have both an imaging function and a light deflection function;

determining metasurface units at different regional positions on the metalens according to the phases at different positions on the metalens and the lens structure database; and constructing the metalens by using the metasurface units at different regional positions on the metalens.

11. The construction method according to claim 10, wherein the constructing the lens structure database comprises:

constructing a basic structure database comprising a plurality of metasurface units whose phase information covers a range of 0 to $2\pi$;

obtaining a plurality of basic phases according to a preset phase selection strategy; and selecting a plurality of metasurface units corresponding to the plurality of basic phases from the basic structure database to form the lens structure database.

12. The construction method according to claim 10, wherein the acquiring the phases at different positions on the metalens comprises:

obtaining the phases at different positions on the metalens according to a lens phase formula, wherein the lens phase formula is:

$$\varphi(x,y) = -2\pi(\sqrt{(x^2+y^2)+f^2}-f)/\lambda + 2\pi(x\cos\varphi + y\sin\varphi)\sin\theta/\lambda$$

where (x, y) is coordinates of different position points on the metalens, a geometric center of the metalens is a coordinate origin, $\varphi$ (x, y) is a phase at a position point (x, y) on the metalens, $\lambda$ is a wavelength of incident light, f is a focal length of the metalens, $\Phi$ is a coordinate azimuth angle of a pixel island corresponding to the metalens, and $\theta$ is a light deflection angle required by the pixel island corresponding to the metalens.

13. The construction method according to claim 10, wherein the obtaining the plurality of basic phases according to the preset phase selection strategy comprises:

discretizing the phases at different positions on the metalens, and acquiring phases of different regions on the metalens; and determining the metasurface units at different regional positions on the metalens according to the phases of different regions on the metalens and the lens structure database.

14. The construction method according to claim 10, wherein the constructing the metalens by using the metasurface units at different regional positions on the metalens comprises: performing structural filling at different regional positions of the metalens by utilizing the acquired metasurface units at different regional positions, so as to construct the metalens.

* * * * *